(No Model.)

J. TOBIN.
COFFEE POT.

No. 308,015. Patented Nov. 11, 1884.

WITNESSES:
Fred. G. Dieterich.
Arthur L. Morsell.

INVENTOR.
John Tobin
By Louis Bagger & Co.
ATTORNEYS.

N. PETERS, Photo-Lithographer, Washington, D. C.

UNITED STATES PATENT OFFICE.

JOHN TOBIN, OF NEWARK, NEW JERSEY.

COFFEE-POT.

SPECIFICATION forming part of Letters Patent No. 308,015, dated November 11, 1884.

Application filed April 14, 1884. (No model.)

*To all whom it may concern:*

Be it known that I, JOHN TOBIN, a citizen of the United States, and a resident of Newark, in the county of Essex and State of New Jersey, have invented certain new and useful Improvements in Coffee-Pots; and I do hereby declare that the following is a full, clear, and exact description of the invention, which will enable others skilled in the art to which it appertains to make and use the same, reference being had to the accompanying drawings, which form a part of this specification, and in which—

Figure 1:
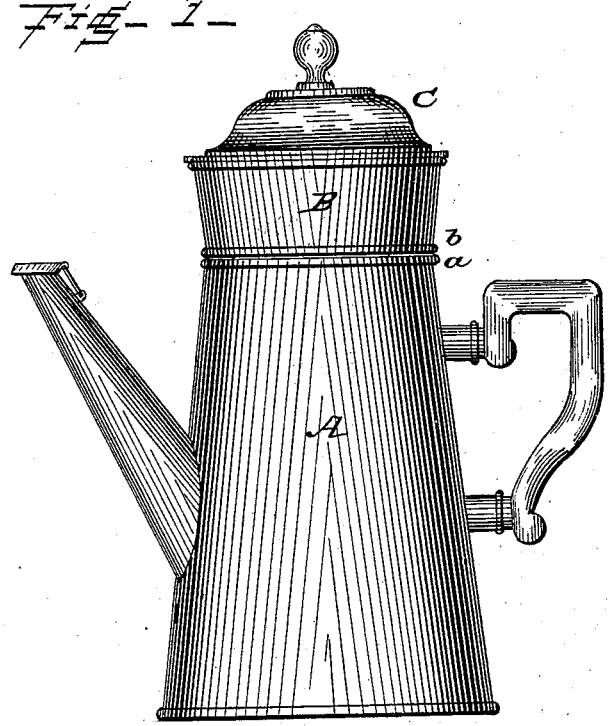
Figure 3:
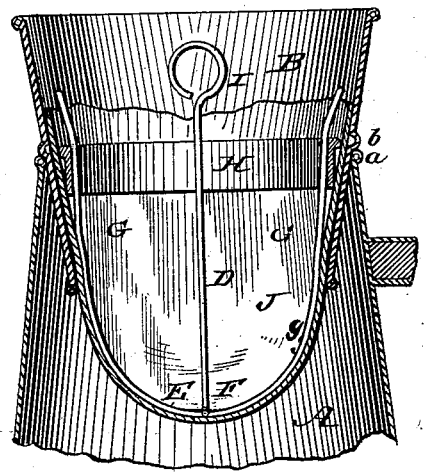
Figure 2:
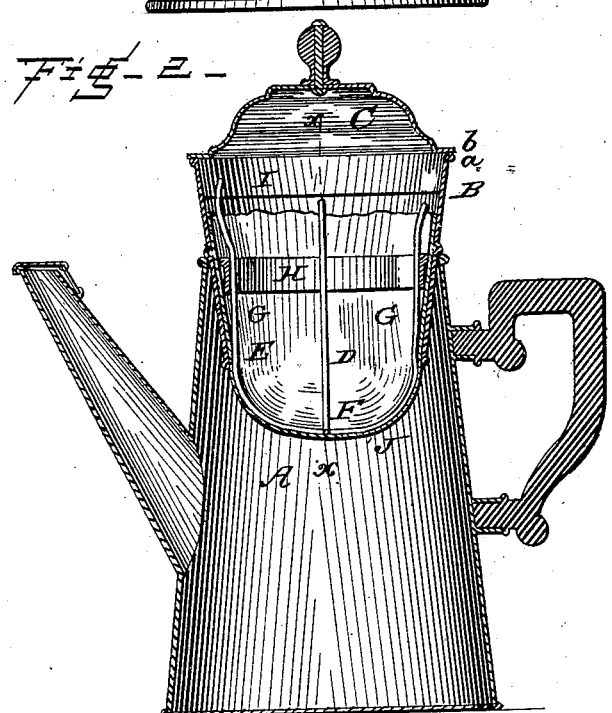
Figure 4:
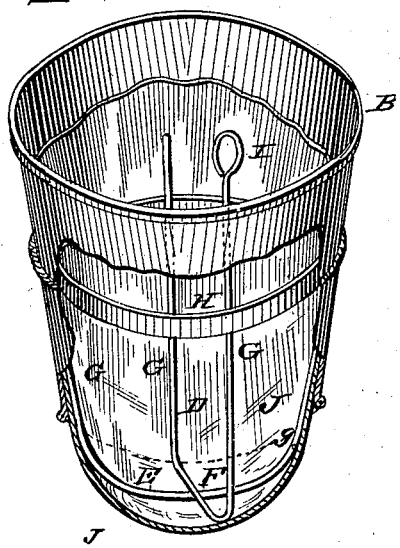

Figure 1 is a side view of my improved coffee-pot. Fig. 2 is a vertical sectional view of the same. Fig. 3 is a vertical section through line $x\ x$ in Fig. 2, and Fig. 4 is a perspective detail view of the removable filter cage or basket.

Similar letters of reference indicate corresponding parts in all the figures.

My invention has relation to that class of coffee-pots known as "percolators;" and it consists in the improved construction of the filter cage or basket which supports or holds the filter through which the coffee is percolated, and in the combination of the said basket with the percolator funnel or holder, as will be hereinafter more fully described, and particularly pointed out in the claims.

In the accompanying drawings, A denotes the coffee-pot, and B the funnel or coffee-receptacle, which has a bead, $b$, resting upon the beaded rim $a$ of the pot. C is the cover, which is of such a size that it will fit the flaring top of the receptacle H.

My improved filter cage or basket is formed by two pieces of wire, D and E, crossing each other at F at right angles and bent to form arms G, which are made curved or bulging, as shown at $g$, and fastened at their upper ends to a sheet-metal ring, H. One of the arms G is longer than the rest, and is bent at its upper end to form an inwardly projecting ring or handle, I, by means of which the cage may be lifted out of or inserted into the percolator or coffee-receptacle B.

From the foregoing description, taken in connection with the drawings, the manner of using this device will readily be understood. The filter-cloth J is placed inside of the percolator B, and held in place therein by the bulging arms G of the cage, which press with their bulge $g$ against the inner tapering sides of the percolator B, the upper end of the cloth being prevented from falling into the filter-cage by the ring or annular band H and upper ends of the arms G, which for this purpose project some distance above the ring. The wire cross D E offers no obstruction to the free percolation of the coffee-extract through the filter, and at the same time prevents the filter from collapsing, holding it out even and smooth at its lower end, as shown.

I am well aware that coffee-pots of this class have been made before in which the filter-cloth or percolating-cloth is held in place inside of the percolator by a funnel inserted into the same, so as to clamp the edges of the filter between it and the inner tapering sides of the percolator, and this construction I do not, therefore, claim broadly; but

What I claim as my improvement, and desire to secure by Letters Patent of the United States, is as follows:

1. The filter cage or basket consisting of the wire cross D E, having bulging arms G $g$ at right angles to the cross, one of said arms being longer than the rest and bent inwardly to form the ring or handle I and the ring H, to which the upper ends of the bulging arms are fastened, substantially as and for the purpose herein shown and specified.

2. The combination of the tapering percolator or coffee-receptacle B, filter J, and the filter cage or basket consisting of the wire cross D E, outwardly-bulging arms G $g$, ring H, and inwardly-bent handle I, substantially as and for the purpose herein shown and specified.

In testimony that I claim the foregoing as my own I have hereunto affixed my signature in presence of two witnesses.

JOHN TOBIN.

Witnesses:
JAMES H. PRICE,
JOHN A. RODRIGO.